United States Patent [19]
Roberts

[11] 3,850,284
[45] Nov. 26, 1974

[54] CONTAINER SEALING MACHINE SIDE BELT SYSTEM

[75] Inventor: Cecil P. Roberts, Lancaster, Ohio

[73] Assignee: Anchor Hocking Corporation, Lancaster, Ohio

[22] Filed: Nov. 6, 1972

[21] Appl. No.: 303,938

[52] U.S. Cl. .............................. 198/165, 198/204
[51] Int. Cl. ............................................ B65g 15/14
[58] Field of Search .......... 53/331.5; 198/165, 117, 198/204; 403/87

[56] References Cited
UNITED STATES PATENTS

| | | | |
|---|---|---|---|
| 1,139,823 | 5/1915 | Thomas et al. | 403/87 |
| 3,386,564 | 6/1968 | Pease | 198/165 |
| 3,647,051 | 3/1972 | Didas | 198/204 |

FOREIGN PATENTS OR APPLICATIONS

| | | | |
|---|---|---|---|
| 1,071,008 | 6/1967 | Great Britain | 53/331.5 |

Primary Examiner—Evon C. Blunk
Assistant Examiner—Douglas D. Watts
Attorney, Agent, or Firm—Holland, Armstrong, Wilkie & Previto

[57] ABSTRACT

The invention is an improved feed belt system for carrying containers through straight line sealing machines of the type where the containers are sealed with closure caps as they pass through the sealing machine. Present sealing machines have container feeding means including horizontal conveyor belts for carrying the containers under the sealing heads and a paid of side belts which engage the side portions of the containers to stabilize and to carry the containers under the sealing mechanisms. This invention provides improved supports or back-up bars for adjustably positioning the side belts and for permitting them to be tilted both longitudinally and laterally with respect to the support conveyor permitting the sealing machine to be readily and rapidly adjusted for handling containers of differing shapes at high sealing speeds.

5 Claims, 8 Drawing Figures

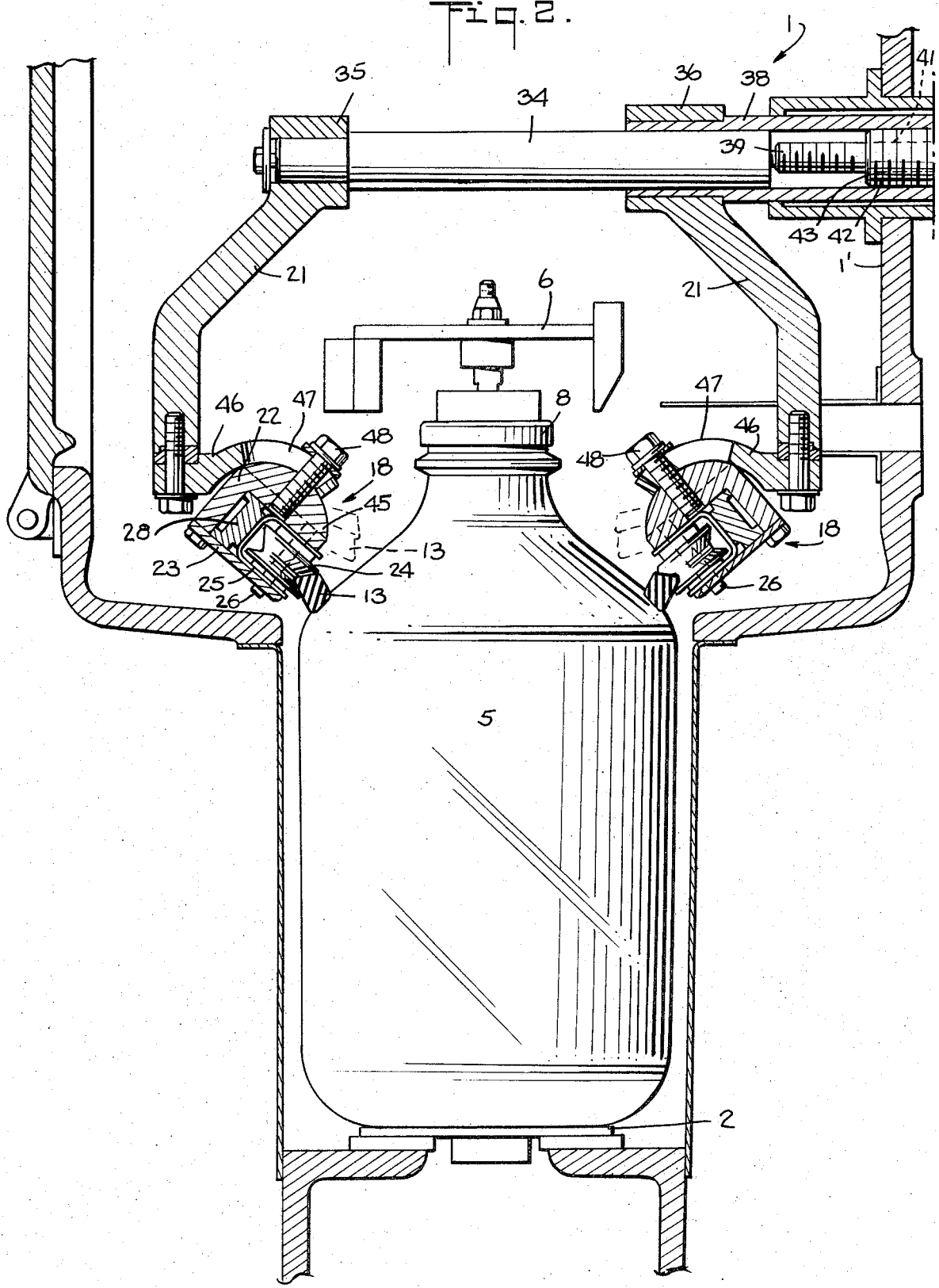

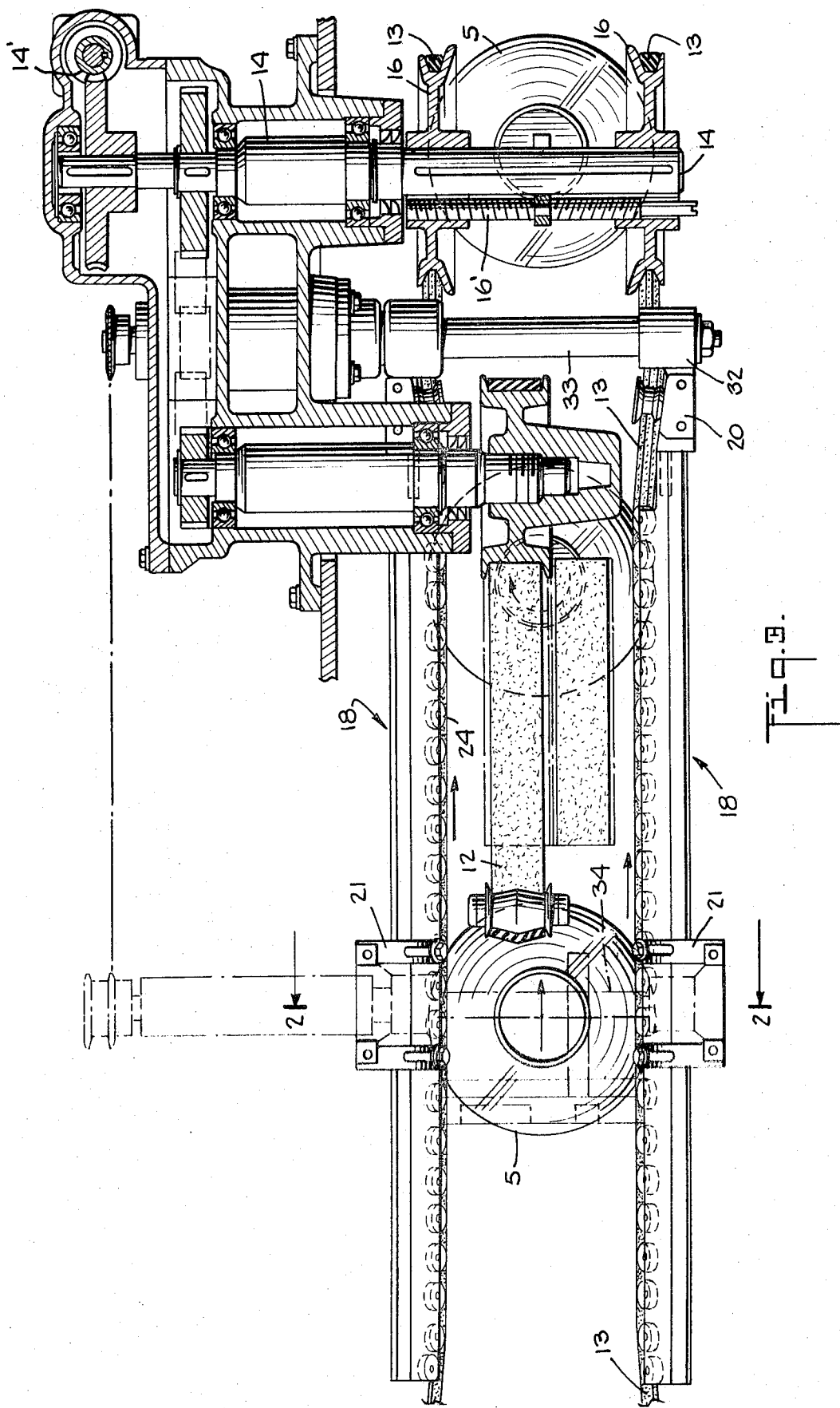

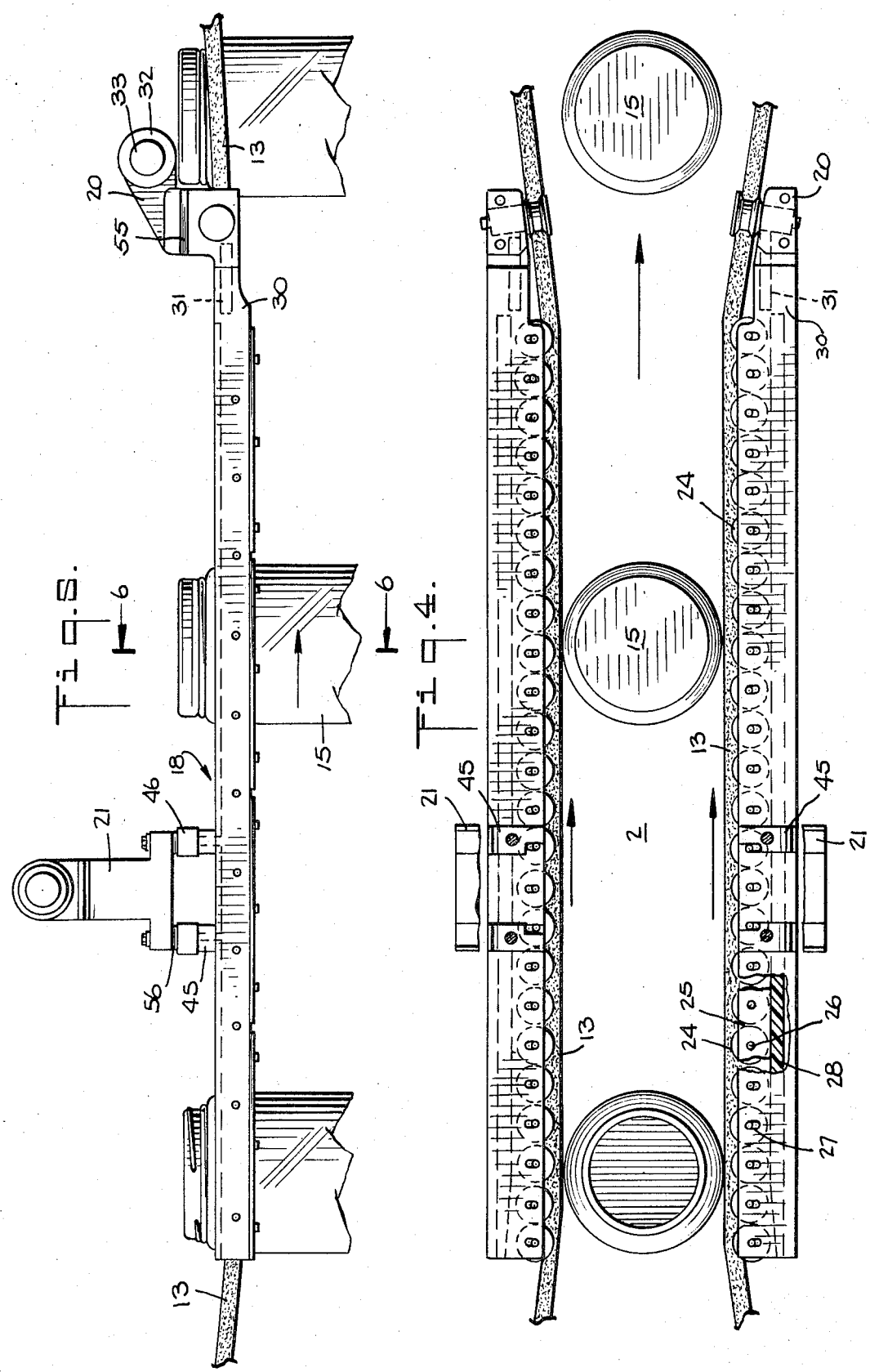

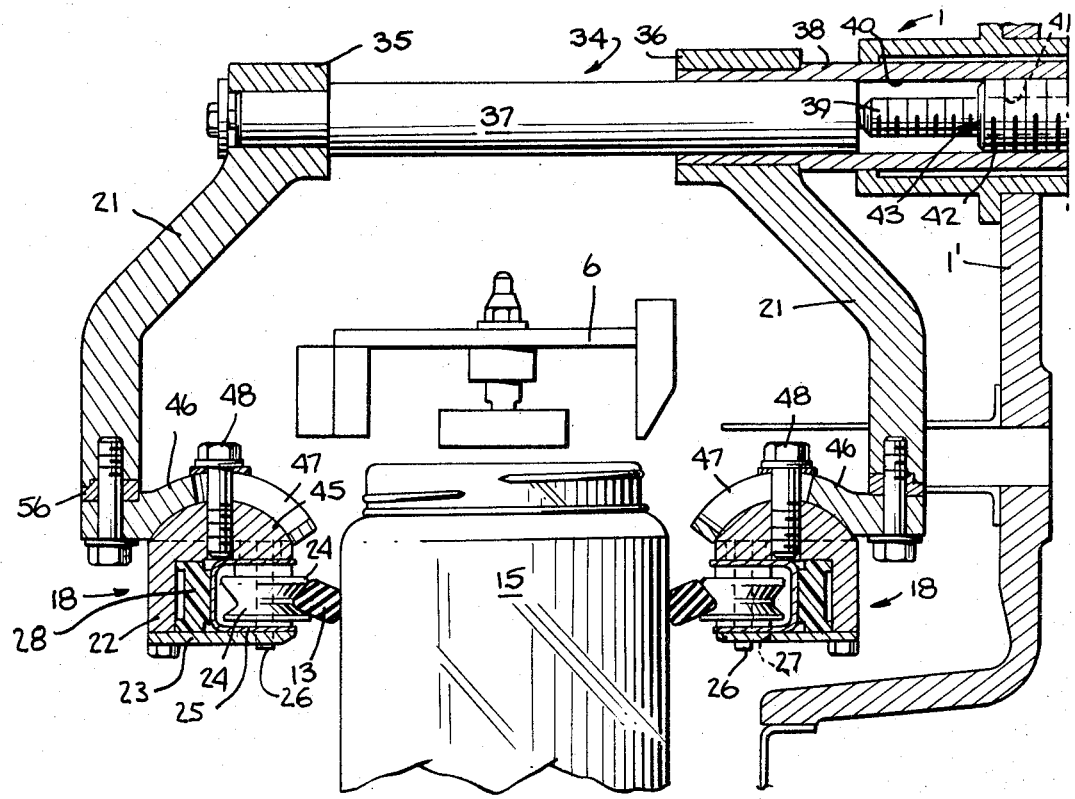
Fig.6.
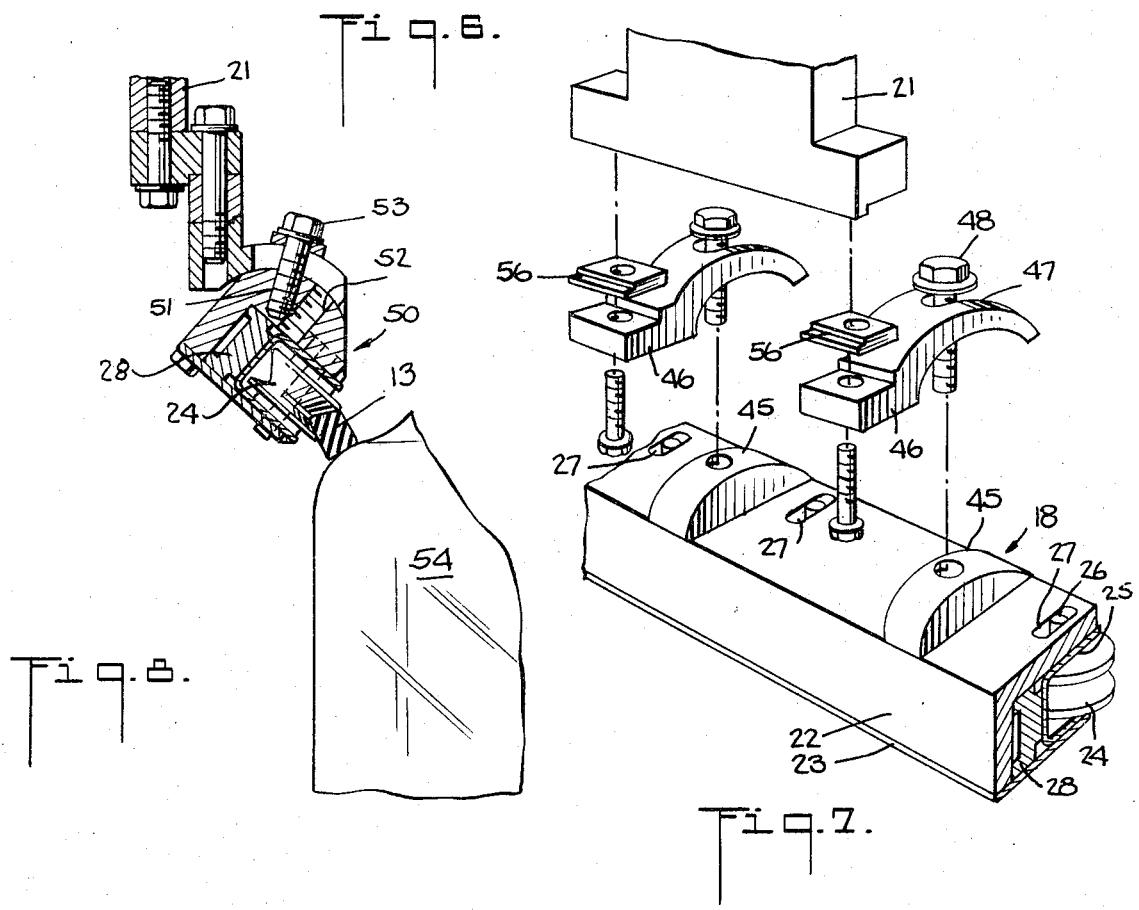
Fig.8.
Fig.7.

CONTAINER SEALING MACHINE SIDE BELT SYSTEM

BACKGROUND OF THE INVENTION

The present invention relates to the sealing art and more particularly to improvements in container sealing machines of the straight line type which utilize horizontal conveyors for carrying containers beneath cap sealing heads for sealing containers with closure caps.

Straight line sealing machines have been in use for sometime and have been improved so that they carry containers through the sealing operation at extremely high speeds. In the meanwhile, consumer preferences in connection with packaged products of the type sealed on these machines have resulted in a rapid increase in the number of uniquely styled or shaped containers used. There therefore is a need for high speed straight line sealing machines which may be utilized to successively handle a variety of differently shaped containers in successive sealing runs and for sealing machines which may be rapidly and effectively adjusted to handle the differing shaped containers.

A sealing machine of the type now being utilized for high speed sealing is illustrated, for example, in U.S. Pat. No. 3,274,748 owned by the assignee of the present invention. A preferred embodiment of an improved side sealing belt system will be described herein which may be used in that sealing machine, however, it is clear that the system is also applicable to other straight line sealing machines having container sealing heads mounted above horizontal container feed conveyors.

Accordingly, an object of the present invention is to provide an improved high speed straight line sealing machine adapted for handling containers of differing shapes.

Another object of the present invention is to provide a straight line sealing machine which may be rapidly and easily adjusted for handling containers of differing shapes.

Another object of the present invention is to provide an improved straight line sealing machine particularly adapted for handling containers with flaring or curved side wall portions.

Other and further objects of the invention will be obvious upon an understanding of the illustrative embodiment about to be described or will be indicated in the appended claims, and various advantages not referred to herein will occur to one skilled in the art upon employment of the invention in practice.

BRIEF DESCRIPTION OF THE DRAWING

A preferred embodiment of the invention has been chosen for purposes of illustration and description and is shown in the accompanying drawing forming a part of the specification, wherein:

FIG. 2 is a vertical sectional view illustrating the improved side belt assembly taken along line 2—2 on FIG. 3.

FIG. 3 is a top plan view partially cut away illustrating the improved side belt assembly.

FIG. 4 is a top plan view of the back-up bar assembly in accordance with the present invention.

FIG. 5 is a side elevational view of the back-up bar assembly of FIG. 4.

FIG. 6 is a vertical sectional view taken along line 6—6 on FIG. 5.

FIG. 7 is an exploded perspective view illustrating a preferred embodiment of a support arm for the back-up bars in accordance with the present invention.

FIG. 8 is a vertical sectional view illustrating another embodiment of the back-up bar assembly of the present invention.

DESCRIPTION OF THE PREFERRED EMBODIMENT

Figure 1:
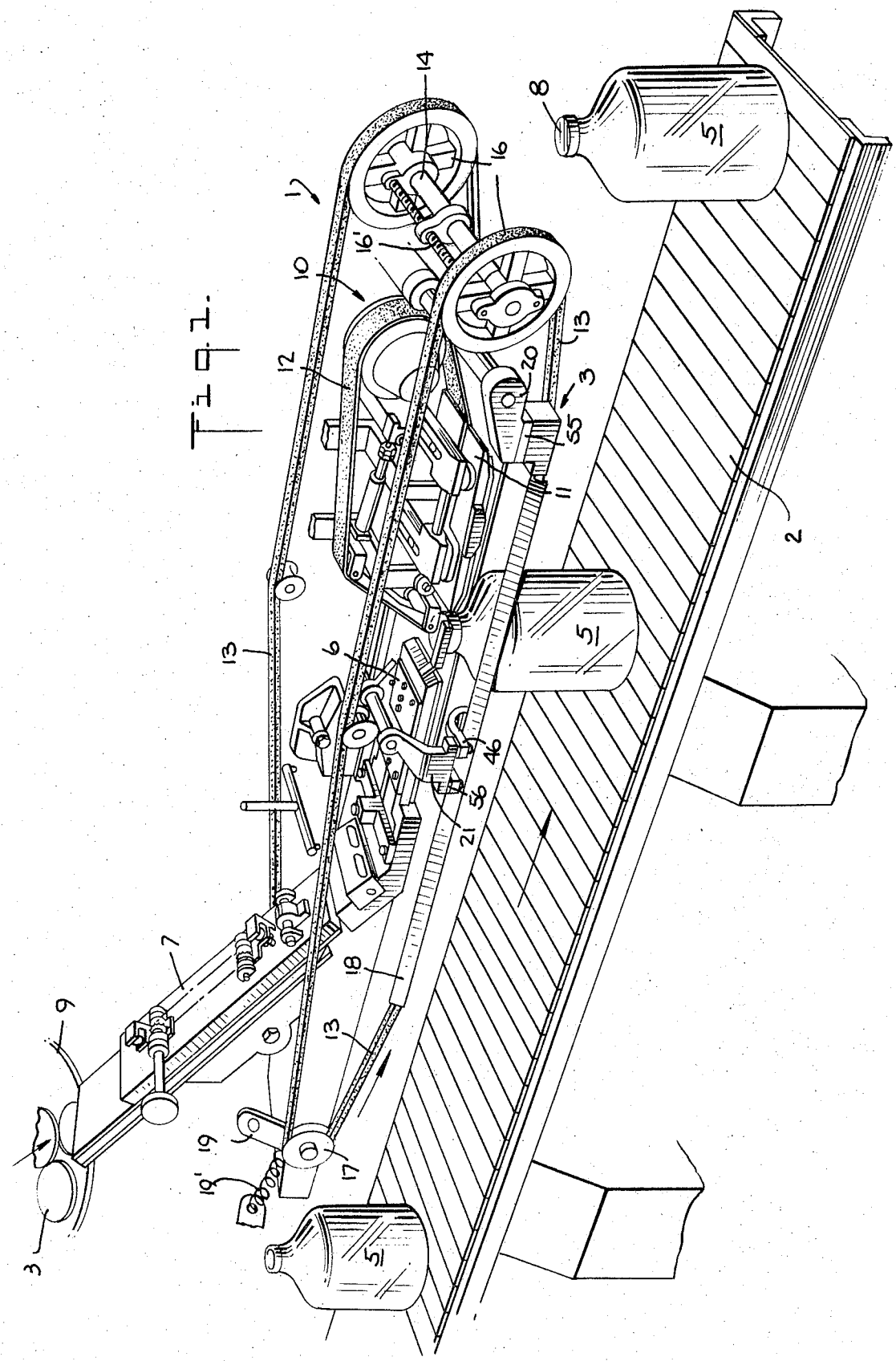
FIG. 1 is a perspective view illustrating the container support conveyor and the sealing head assembly for a straight line sealing machine incorporating an improved side belt assembly in accordance with the present invention.

FIG. 1 illustrates a sealing head assembly 1 of a straight line sealing machine positioned above the machine conveyor 2 as used in present sealing machines, such as the machine of the above noted U.S. patent, and incorporating the improved side belt assembly 3 in accordance with the present invention.

The conveyor 2 is shown carrying a number of spaced containers 5 beneath the sealing head assembly 1. The sealing head assembly 1 includes a cap applicator 6 fed by a chute 7 carrying closure caps 8 from a supply hopper 9 and for applying the cap 8 lightly to the moving containers. Thereafter, the moving containers 5 with the caps 8 lightly applied move beneath a sealing head 10 which will tightly screw the caps 8 into sealing position on the containers 5. FIG. 1 illustrates a sealing machine for applying threaded caps 8 which are twisted onto the containers 5 by means of a drag shoe 11 and an adjacent driven sealing belt 12. Other applicators and sealing heads may be used, however, in all cases it is desirable to have a pair of container stabilizing side belts 13 gripping side or upper portions of the moving containers 5 for holding the containers 5 on the conveyor 2 and for moving them in an upright and steady manner beneath the applicator 6 and sealing head 10.

While some containers, such as the type illustrated at 15 in FIG. 6, may be essentially cylindrical so that they present vertical surfaces to the side belts 13, a variety of differing shaped containers must also be sealed including bottles having a significantly rounded upper portions of the type illustrated at 5 in FIGS. 1 and 2.

The improved side belt assembly 3 of the present invention for handling these and other container shapes will now be described in detail.

As shown in FIG. 1, the means for carrying the containers 5 through the cap applying and sealing stations of a typical straight line sealing machine includes the support conveyor 2 with a horizontal upper run and a pair of container gripping side belts 13 for stabilizing the containers 5 during the application and sealing of the closure caps 8.

The side belts 13 are preferably mounted upon spaced pulleys including drive pulleys 16 at the exit end and tensioning pulleys 17 at the entrance ends of the belts 13. Both of the pulleys 16 and 17 are seen to be spaced from the back-up bars 18 so that there is an open portion of the side belts 13 between the pulleys 16 or 17 and the back-up bars 18 permitting most spacing and tilting adjustments of the back-up bars 18 to be made without requiring any change in the lateral spacing of the pulleys 16 or 17. The tensioning pulleys 17 are mounted on pivotal arms 19 which hold the side belts 13 in tension under the force of tensioning spring 19'. This tensioning arrangement further facilitates the side belt 13 spacing and positioning adjustments which will be further described below.

The drive pulleys 16 are mounted on a suitable drive shaft 14, as illustrated in FIGS. 1 and 3, which is coupled to a geared drive system 14' synchronized with the other driven portions of the sealing machine including the conveyor belt drive. The axial position of the drive pulleys 16 is adjusted by screw 16' when necessary. The above described pulleys 16 and 17 including the drive shaft 14 as well as the cap applicator 6 and the sealing head 10 are all preferably mounted on a unitary sealing machine head assembly 1 which permits the above named elements to be raised and lowered simultaneously for differing container shapes using a suitable head assembly height adjustment as, for example, the height adjustment described in the above noted U.S. patent.

The adjustable back-up bars 18 in accordance with the present invention are also mounted on the head assembly by being attached to the head assembly 1 chamber walls 1' (FIG. 2) as will be clearly seen from the following detailed description of the side belt assembly 3.

The central portions of the lower runs of the two side belts 13 are held in gripping engagement with the moving containers 5 or 15 by means of the side belt assemblies 3. Each of these assemblies 3 comprises an elongated back-up bar 18 having a support arm 20 at its exit end and an additional adjusting support arm 21 coupled near the entrance end of the back-up bars.

Each of the back-up bars 18 comprises a channel-shaped roller support which in the preferred embodiment has an L-shaped unitary top and back member 22 and a removable bottom 23 for inserting the rollers 24. The preferred roller mounting comprises U-shaped roller supports 25 each mounting a pair of rollers 24 on roller pins 26. The roller pins 26 extend above and below the roller supports 25 and are contained in elongated slots 27 provided in the member 22 and the bottom 23. A resilient backing member 28 is positioned between the back of the roller supports 25 and the member 22. The resilient member 28 urges the roller supports 25 together with the rollers 24 and side belts 13 inwardly so that in the absence of a container, each of the roller supports 25 is urged towards its innermost position. When containers 5 pass through the machine and engage the side belts 13 in the manner shown in FIGS. 2, 6 and 8, for example, the side belts 13 are held tightly against the container 5 side walls.

The exit ends of each of the back-up bars 18 includes a solid end portion 30 which is coupled by a swivel pin 31 to the exit support arm 20. The exit support arm 20 is attached at its upper end by a suitable bearing 32 to a horizontal support member 33. This support member 33, which is generally similar to a corresponding support member 34 for the adjusting support arm 21 as illustrated in FIG. 6, provides for a simultaneous spacing adjustment of the two back-up bars 18 to adjust them for the width of the particular containers being fed through the sealing machine.

It is thus seen that the mounting for the back-up bars 18 at the exit end of the side belt assembly 3 permits the distance between the bars 18 to be adjusted and permits an angular adjustment of the back-up bars 18 about the axis of the swivel pin 31.

As already indicated, generally similar support rods 33 and 34 are provided for the exit support arms 20 and for the adjusting support arms 21. These support rods 33 and 34 provide for a simultaneous spacing adjustment of the back-up bars 18. In the preferred embodiment illustrated in FIG. 6, for example, both of the adjusting support arms 21 have rod engaging bearings 35 and 36 at their upper ends. The left-hand support arm 21 is attached to an inner support rod 37 and the opposite support arm 21 is attached to a coaxial sleeve 38 slidably engaging the inner rod 37. Simultaneous inward or outward movement of the support arms 21 by equal distances is provided by coupling a threaded extension 39 on the inner rod 37 and a threaded inner surface 40 on the sleeve 38 to an inner threaded aperture 41 and an outer threaded surface 42 on an adjustment sleeve 43. Simultaneous adjustment of the threaded sleeves 43 for the two support rods 33 and 34 moves the back-up bars 18 inwardly or outwardly to engage differing size containers 5 while keeping the containers 5 centered on the machine conveyor 2.

FIGS. 2, 6 and 7 illustrate a preferred adjustment means for controlling the tilt of the back-up bars 18 about their longitudinal axes as permitted by the pivot pins 31 at the exit support arms 20. The angular control includes a pair of spaced arcuate bearings 45 which engage cooperating arcuate slotted foot members 46 attached to the two support arms 21. Elongated slots 47 in the foot members 46 are used to couple the arms 21 to the bearings 45 by bolts 48. When the bolts 48 are loosened, the slots 47 permit the back-up bars 18 to be turned about their longitudinal axes, as desired. In the preferred embodiment, V-shaped rollers 24 and generally trapezoidal belt cross-sections are used as illustrated in FIGS. 2 and 6. In FIG. 2, the outer surfaces of the two side belts 13 are engaging a slanted upper neck portion of the containers 5 to properly grip and to support the containers 5. The back-up bars 18 have been tilted or adjusted so that the bolts 48 are at the inner edges of the slots 47 in the two foot members 46.

FIG. 6 illustrates a second position of the back-up bars 18 in which the back-up bars 18 are tilted so that the side belts 13 engage the generally vertical container side walls of container 15. In this position, the adjusting bolts 48 are seen to be near the outer edges of the slots 47 and to be in a general vertical position.

The back-up bar 50 illustrated in FIG. 8 differs by having a pair of threaded bolt holes 51 and 52 for bolts 53. It is seen that this embodiment provides for an additional degree of adjustment. When bolts 53 are used in the left-hand hole 51 in the manner illustrated in FIG. 8, the back-up bar 50 may be tilted to an extreme clockwise position for use with containers 54 having relatively horizontal surfaces. Use of the right-hand hole 52 permits the back-up bar 50 to be tilted a substantial amount in the opposite direction for handling containers with more vertically aligned surfaces. This use of a pair of adjusting bolts thus provides for increased adjustment of the back-up bar 50 position and thus adapts a sealing machine for use with a wide variety of container shapes.

As best seen in FIGS. 1 and 5, shims or spacer blocks 55 and 56 may be used between portions of the back-up bar supports 20 and 21 to make slight adjustments of side belt height relative to the other elements in the sealing machine head assembly 1. The shims or spacer blocks 55 and 56 may also be changed to tilt the back-up bars, for example, to provide a slight downward tilt to help urge the containers downwardly against the conveyor 2.

It will be seen that an improved side belt assembly has been provided for sealing machines which permits a rapid and precise adjustment of side belt positions. The improved assembly adapts sealing machines for use with a variety of container shapes and also permits the machine to be rapidly adjusted for handling successive runs for containers with widely differing shapes. The improved side belt assembly obtains the above results using a rugged and reliable structure which is readily adapted for use with the types of straight line sealing machines now in use so that these machines may be advantageously utilized with a variety of packages having differing shapes, including packages having angular or grooved side wall portions.

As various changes may be made in the form, construction and arrangement of the parts herein without departing from the spirit and scope of the invention, and without sacrificing any of its advantages, it is to be understood that all matter herein is to be interpreted as illustrative and not in a limiting sense.

Having thus described my invention, I claim:

1. In a side belt assembly for a straight line container sealing machine having a driven support conveyor with a horizontal upper run for carrying containers in single file beneath a sealing means and having a pair of endless side belts for gripping containers moving on said support conveyor with each side belt being mounted on spaced pulleys positioning them with container engaging runs of the side belts above and directed longitudinally of the support conveyor, the improvement comprising:

a pair of elongated back-up bars mounted on the sealing machine above the support conveyor and each engaging and guiding said runs of the side belts;

back-up bar mounting means including means for adjustably positioning the back-up bars about their longitudinal axis for setting the container engaging positions of the inner surfaces of the side belts;

said mounting means comprising a pair of spaced support arms supporting each of said back-up bars with one arm of each pair having a pivotal coupling to the back-up bars permitting the back-up bars to tilt about their longitudinal axes and the other arms of each pair having an adjustable coupling for fixing the tilted position of the back-up bars about said pivotal coupling; and said adjustable couplings comprising arcuate bearings on said back-up bars, arcuate slotted foot members on said other arms for slidably engaging said bearings, and coupling belts passing through said slots for adjustably coupling said foot members to said bearings.

2. The side belt assembly as claimed in claim 1 which further comprises means for simultaneously adjusting the spacing between said back-up bars.

3. In a side belt assembly for a straight line container sealing machine having a driven support conveyor with a horizontal upper run for carrying containers in single file beneath a sealing means and having a pair of endless side belts for gripping containers moving on said support conveyor with each side belt being mounted on spaced pulleys positioning them with container engaging runs of the side belts above and directed longitudinally of the support conveyor, the improvement comprising:

a pair of elongated back-up bars mounted on the sealing machine above the support conveyor and each engaging and guiding said runs of the side belts;

back-up bar mounting means including means for adjustably positioning the back-up bars about their longitudinal axis for setting the container engaging positions of the inner surfaces of the side belts;

said mounting means comprising a pair of spaced support arms supporting each of said back-up bars with one arm of each pair having a pivotal coupling to the back-up bars permitting the back-up bars to tilt about their longitudinal axes and the other arms to each pair having an adjustable coupling for fixing the tilted position of the back-up bars about said pivotal coupling;

said adjustable couplings comprising slots in said other arms, and coupling bolts engaging the back-up bars and being adjustably positioned in said slots; and said back-up bars having a plurality of threaded bolt receiving apertures for each of said slots.

4. An improved side belt assembly for a straight line container sealing machine having a driven support conveyor with a horizontal upper run for carrying containers in single file beneath a sealing head comprising the combination of:

a pair of endless side belts for gripping containers moving on said support conveyor;

a pair of spaced mounting pulleys positioned for mounting each of the side belts above the support conveyor with the lower runs of the side belts being above and directed longitudinally of the support conveyor;

a pair of elongated back-up bars mounted above the support conveyor and having a plurality of spaced side belt engaging rollers for engaging the central portions of said lower runs of the side belts;

said back-up bars each having a mounting arm at their exit end;

pivot means attaching the back-up bars to said mounting arm for movement about an axis aligned longitudinally of the support conveyor;

adjusting mounting arms including adjustable means coupling them to said back-up bars in advance of said exit mounting arms;

said adjustable coupling means including means for adjustably positioning the back-up bars about their longitudinal axis for setting the inner container engaging surfaces of the side belts; and said adjustable coupling means comprising arcuate bearings on said back-up bars, arcuate slotted foot members on said adjustable mounting arms for slidably engaging said bearings, and coupling bolts passing through said slots for adjustably coupling said foot members to said bearings.

5. An improved side belt assembly for a straight line container sealing machine having a driven support conveyor with a horizontal upper run for carrying containers in single file beneath a sealing head comprising the combination of:

a pair of endless side belts for gripping containers moving on said support conveyor;

a pair of spaced mounting pulleys positioned for mounting each of the side belts above the support conveyor with the lower runs of the side belts being above and directed longitudinally of the support conveyor;

a pair of elongated back-up bars mounted above the support conveyor and having a plurality of spaced side belt engaging rollers for engaging the central portions of said lower runs of the side belts;

said back-up bars each having a mounting arm at their exit end;

pivot means attaching the back-up bars to said mounting arm for movement about an axis aligned longitudinally of the support conveyor;

adjusting mounting arms including adjustable means coupling them to said back-up bars in advance of said exit mounting arms;

said adjustable coupling means including means for adjustably positioning the back-up bars about their longitudinal axis for setting the inner container engaging surfaces of the side belts;

said adjustable coupling means comprising slots in said adjustable mounting arms, and coupling bolts engaging the back-up bars and being adjustably positioned in said slots; and said back-up bars having a plurality of threaded bolt receiving apertures for each of said slots.

* * * * *